US010563558B2

(12) United States Patent
Murata et al.

(10) Patent No.: US 10,563,558 B2
(45) Date of Patent: Feb. 18, 2020

(54) EXHAUST HEAT RECOVERY UNIT (71) Applicants: Toshio Murata, Toyota (JP);
Yoshikazu Shimpo, Nisshin (JP);
Yoshihiro Koga, Gifu (JP)

(72) Inventors: Toshio Murata, Toyota (JP);
Yoshikazu Shimpo, Nisshin (JP);
Yoshihiro Koga, Gifu (JP)

(73) Assignees: TOYOTA JIDOSHA KABUSHIKI KAISHA, Toyota-shi (JP); IBIDEN CO., LTD., Ogaki-shi (JP)

( * ) Notice: Subject to any disclaimer, the term of this patent is extended or adjusted under 35 U.S.C. 154(b) by 59 days.

(21) Appl. No.: 15/950,329

(22) Filed: Apr. 11, 2018

(65) Prior Publication Data

US 2018/0298803 A1 Oct. 18, 2018

(30) Foreign Application Priority Data

Apr. 18, 2017 (JP) ................................ 2017-082335

(51) Int. Cl.
*F01N 5/02* (2006.01)
*F01N 3/02* (2006.01)
(Continued)

(52) U.S. Cl.
CPC .............. *F01N 5/02* (2013.01); *F01N 3/0205* (2013.01); *F01N 3/04* (2013.01); *F01N 3/043* (2013.01); *F28D 21/0003* (2013.01); *F28F 9/0248* (2013.01); *F01N 2240/02* (2013.01); *Y02T 10/16* (2013.01)

(58) Field of Classification Search
CPC .......... F01N 3/0205; F01N 3/04; F01N 3/043; F01N 5/02; F01N 2240/02; F28D 21/0003; F28F 9/0248
See application file for complete search history.

(56) References Cited

U.S. PATENT DOCUMENTS

2007/0131399 A1* 6/2007 Digele ...................... F01N 5/02
165/158
2014/0251579 A1* 9/2014 Sloss ........................ F01N 5/02
165/96

(Continued)

FOREIGN PATENT DOCUMENTS

CN 2135651 Y 6/1993
JP 2009-62915 3/2009
(Continued)

*Primary Examiner* — Audrey K Bradley
(74) *Attorney, Agent, or Firm* — Oblon, McClelland, Maier & Neustadt, L.L.P.

(57) ABSTRACT

An exhaust heat recovery unit that includes: a lead-in pipe that leads a heat medium from outside an exhaust pipe, via an inlet portion of an heat exchanger, into the heat exchanger; a lead-out pipe that leads the heat medium out from the heat exchanger, via an outlet portion of the heat exchanger, outside the exhaust pipe; and a pair of seal members that seal a space between the inlet portion and the lead-in pipe and a space between the outlet portion and the lead-out pipe, with at least one of the pair of seal members including an O-ring disposed in a position in which the at least one of the pair of seal members does not contact exhaust gas flowing through the exhaust pipe and in which the at least one of the pair of seal members contacts the heat medium.

9 Claims, 3 Drawing Sheets (51) Int. Cl.
  *F01N 3/04* (2006.01)
  *F28D 21/00* (2006.01)
  *F28F 9/02* (2006.01)

(56) References Cited

U.S. PATENT DOCUMENTS

2015/0338169 A1* 11/2015 Okami .................. F01N 5/02
                                                    165/157
2016/0245597 A1*  8/2016 Meshenky ............. F28D 9/005
2016/0282053 A1*  9/2016 Bardeleben ........... F28F 9/0248

FOREIGN PATENT DOCUMENTS

| JP | 2015-102051 A | 6/2015 |
| JP | 2016-118322 A | 6/2016 |
| JP | 2016-223717   | 12/2016 |

* cited by examiner

EXHAUST HEAT RECOVERY UNIT

CROSS-REFERENCE TO RELATED APPLICATION

This application is based on and claims priority under 35 USC 119 from Japanese Patent Application No. 2017-082335 filed on Apr. 18, 2017, which is incorporated by reference herein.

BACKGROUND

Technical Field

The present disclosure relates to an exhaust heat recovery unit.

Related Art

Japanese Patent Application Laid-open (JP-A) No. 2009-062915 discloses an exhaust heat recovery unit equipped with a heat exchanger (evaporator portion) provided inside an exhaust pipe (duct portion). In the exhaust heat recovery unit of JP-A No. 2009-062915, a lead-in pipe (condensation-side coupler) that leads a heat medium (operating fluid) into the heat exchanger and a lead-out pipe (evaporation-side coupler) that leads the heat medium out from the heat exchanger to the outside of the exhaust pipe are connected to a pair of open portions (joints) provided in the heat exchanger.

Here, in an exhaust heat recovery unit where a pipe (a lead-in pipe or a lead-out pipe) is connected to an open portion, in a seal structure where a seal member that seals the space between the open portion and the pipe is directly exposed to high-temperature exhaust gas circulating through the exhaust pipe, it has been necessary to form, by machining, a complex structure to ensure a seal at the open portion.

SUMMARY

An aspect of an exhaust heat recovery unit includes: a heat exchanger provided inside an exhaust pipe through which exhaust gas flows, the heat exchanger exchanging heat between the exhaust gas and a heat medium; a pair of open portions that include an inlet portion and an outlet portion, the inlet portion being formed in the heat exchanger and being configured to lead the heat medium into the heat exchanger, and the outlet portion being formed in the heat exchanger and being configured to lead the heat medium out from the heat exchanger; a lead-in pipe that is connected to the inlet portion and leads the heat medium from outside the exhaust pipe, via the inlet portion, into the heat exchanger; a lead-out pipe that is connected to the outlet portion and leads the heat medium out from the heat exchanger, via the outlet portion, outside the exhaust pipe; and a pair of seal members that seal a space between the inlet portion and the lead-in pipe and a space between the outlet portion and the lead-out pipe, with at least one of the pair of seal members including an O-ring disposed in a position in which the at least one of the pair of seal members does not contact the exhaust gas flowing through the exhaust pipe and in which the at least one of the pair of seal members contacts the heat medium.

DESCRIPTION OF EMBODIMENTS

Examples of embodiments of the present disclosure will be described below on the basis of the drawings.

First Embodiment (Exhaust Pipe Structure 10)

Figure 1:
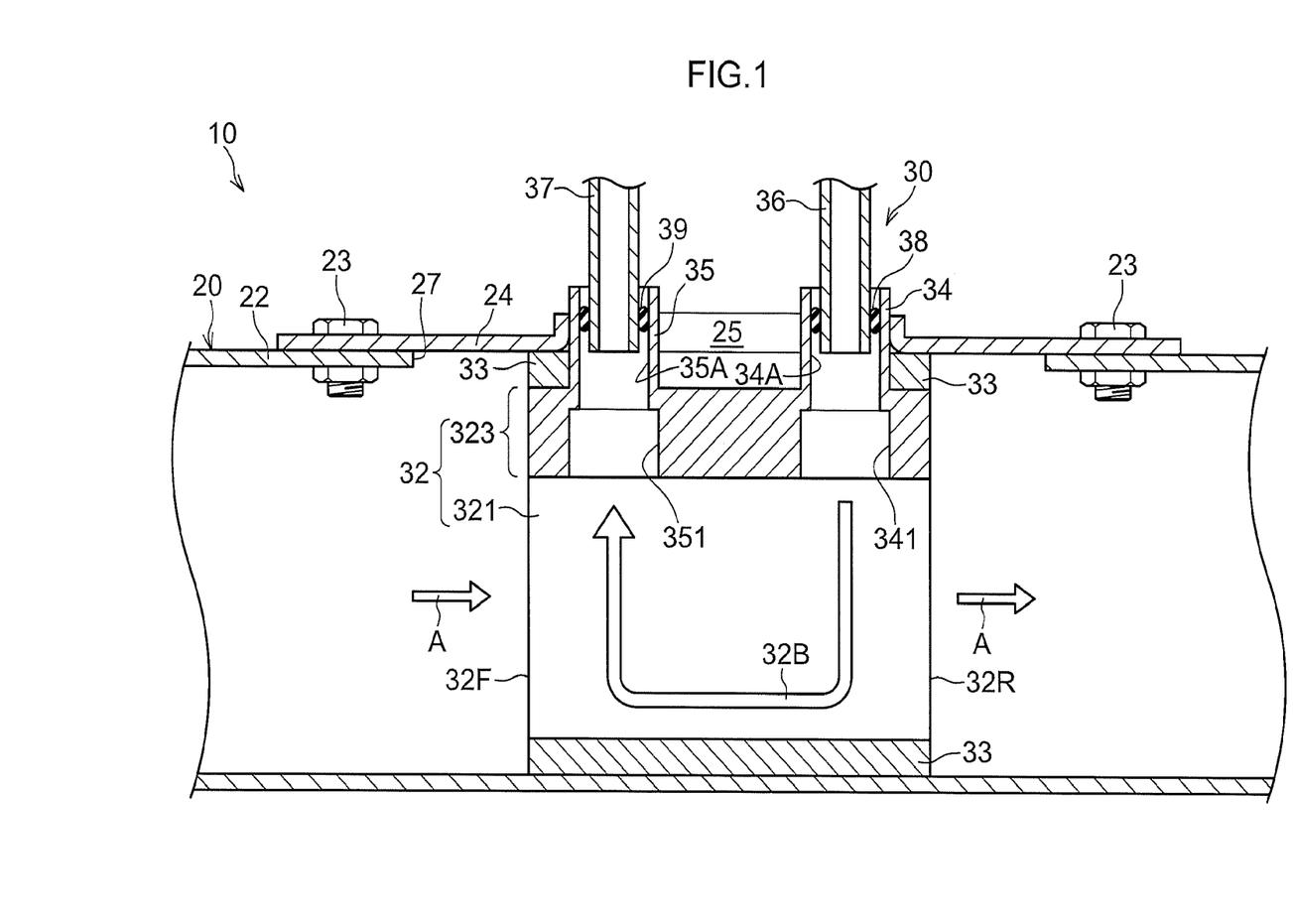
FIG. 1 is a sectional view showing the configuration of an exhaust pipe structure pertaining to a first embodiment.

First, the configuration of an exhaust pipe structure 10 to which an exhaust heat recovery unit 30 pertaining to a first embodiment has been applied will be described. FIG. 1 is a sectional view of the exhaust pipe structure 10.

The exhaust pipe structure 10 is an exhaust pipe structure for a vehicle such as an automobile, and is a pipe structure for exhausting to the atmosphere (outside the vehicle) exhaust gas exhausted from the engine of the vehicle. Specifically, as shown in FIG. 1, the exhaust pipe structure 10 is equipped with an exhaust pipe 20 and the exhaust heat recovery unit 30.

The exhaust pipe 20 is configured by a tubular pipe, and exhaust gas flows in one direction inside the exhaust pipe 20. In each of the drawings, the gas flow direction, which is the direction in which the exhaust gas flows, is indicated by arrows A. The exhaust pipe 20 specifically has an exhaust pipe body 22 and a cover portion 24.

The exhaust pipe body 22 is configured by a tubular pipe. In the exhaust pipe body 22 is formed an accommodating opening 27 for accommodating, inside the exhaust pipe body 22, a later-described heat exchanger 32 of the exhaust heat recovery unit 30. The cover portion 24 covers the accommodating opening 27 and is secured to the exhaust pipe body 22 by fastening members 23 as an example. In the cover portion 24 is formed an opening 25 into which a later-described inlet portion 34 and outlet portion 35 of the exhaust heat recovery unit 30 are inserted. It will be noted that the exhaust gas has a temperature in the range of 200° C. to 800° C., for example.

The exhaust heat recovery unit 30 has the function of exchanging heat between the exhaust gas flowing through the exhaust pipe 20 and a heat medium to thereby recover the heat of the exhaust gas and reutilize the heat. As the heat medium, for example, a coolant (long life coolant (LLC)) for cooling the engine is used. The heat medium has a temperature lower than the temperature of the exhaust gas. In the case of using a coolant as the heat medium, the temperature of the heat medium reaches about 130° C. at its highest, for example.

As shown in FIG. 1, the exhaust heat recovery unit 30 specifically has a heat exchanger 32, an inlet portion 34 and an outlet portion 35 (an example of a pair of open portions), a lead-in pipe 36, a lead-out pipe 37, O-rings 38 and 39 (an example of a pair of seal members), and a seal 33 (an example of a buffer).

The heat exchanger 32 is provided inside the exhaust pipe 20 and has the function of exchanging heat between the exhaust gas flowing through the inside of the exhaust pipe 20 and the heat medium. Specifically, the heat exchanger 32 has a heat exchanger body 321 and a flow passage forming portion 323 in which an inflow passage 341 and an outflow passage 351 are formed.

The flow passage forming portion 323 is integrally provided in the upper surface of the heat exchanger body 321. The inflow passage 341 allows the heat medium from the inlet portion 34 to flow therethrough to the near side of the page in FIG. 1 (direction −D in FIG. 2) and the far side of the page in FIG. 1 (direction +D in FIG. 2) at the upper surface of the heat exchanger body 321. The outflow passage 351 allows the heat medium from the heat exchanger body 321 to flow therethrough to the far side of the page in FIG. 1 (direction −E in FIG. 2) and the near side of the page in FIG. 1 (direction +E in FIG. 2) toward the outlet portion 35.

Figure 2:
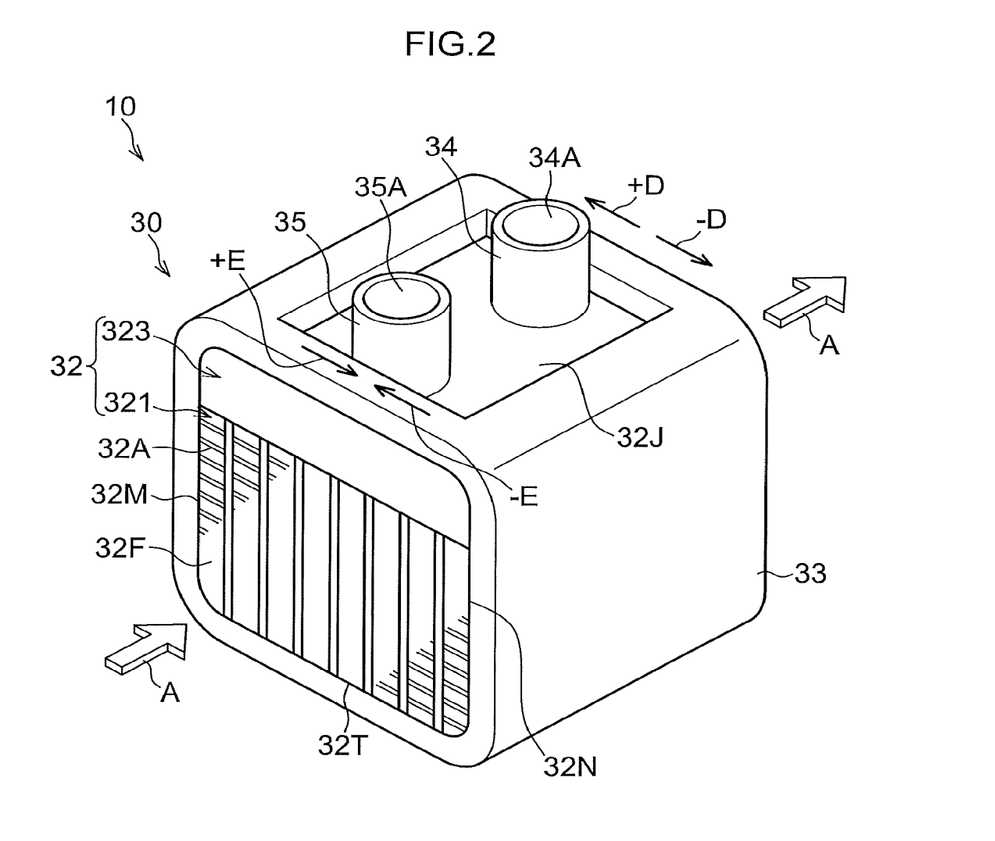
FIG. 2 is a perspective view showing the configuration of an exhaust heat recovery unit pertaining to the first embodiment.

As shown in FIG. 2, in the heat exchanger body 321 are formed plural gas flow passages 32A that allow the exhaust gas to flow therethrough along the direction of arrows A from a side surface 32F to a side surface 32R (see FIG. 1) of the heat exchanger body 321.

The gas flow passages 32A are arranged two-dimensionally (grid-like) as seen from the direction of arrows A, and inlets and outlets of the gas flow passages 32A are arranged two-dimensionally in the side surface 32F and the side surface 32R (see FIG. 1), respectively.

Moreover, as shown in FIG. 1, inside the heat exchanger body 321 are formed plural medium flow passages 32B that allow the heat medium to flow therethrough from the inflow passage 341 (the inlet portion 34) toward the outflow passage 351 (the outlet portion 35). The plural medium flow passages 32B are disposed alternating with the plural gas flow passages 32A and are partitioned from the gas flow passages 32A by partition walls. Additionally, heat exchange is carried out, via the partition walls, between the heat medium flowing through the medium flow passages 32B and the exhaust gas flowing through the gas flow passages 32A.

Furthermore, the heat exchanger 32, including the heat exchanger body 321 and the flow passage forming portion 323, is formed of silicon carbide. Silicon carbide is super-hard, resistant to heat, and resistant to wear.

The inlet portion 34 is an open portion for leading the heat medium into the inside (the inflow passage 341) of the heat exchanger 32. The inlet portion 34 is formed of silicon carbide integrally with the flow passage forming portion 323 of the heat exchanger 32. Specifically, as shown in FIG. 1, the inlet portion 34 extends upward from the upper end portion (the upper part of the inflow passage 341) of the gas flow direction (direction A) downstream-side part of the flow passage forming portion 323 of the heat exchanger 32. Moreover, the distal end portion of the inlet portion 34 projects outward in the radial direction of the exhaust pipe 20 through the opening 25 in the cover portion 24 of the exhaust pipe 20. A lead-in passage 34A that communicates with the inflow passage 341 is formed in the inlet portion 34.

The outlet portion 35 is an open portion for leading the heat medium out from the inside (the outflow passage 351) of the heat exchanger 32. The outlet portion 35 is formed of silicon carbide integrally with the flow passage forming portion 323 of the heat exchanger 32. Specifically, as shown in FIG. 1, the outlet portion 35 extends upward from the upper end portion of the gas flow direction (direction A) upstream-side part of the flow passage forming portion 323 of the heat exchanger 32. Moreover, the distal end portion of the outlet portion 35 projects outward in the radial direction of the exhaust pipe 20 through the opening 25 in the cover portion 24 of the exhaust pipe 20. A lead-out passage 35A that communicates with the outflow passage 351 is formed in the outlet portion 35.

As mentioned above, the distal end portions of the inlet portion 34 and the outlet portion 35 project outward of the exhaust pipe 20, and the space on the inside (inner surface side) of the inlet portion 34 and the space on the inside (inner surface side) of the outlet portion 35 are isolated from the internal space of the exhaust pipe 20. In the way described above, in the present embodiment, a pair of open portions formed in the heat exchanger 32 are configured by the inlet portion 34 and the outlet portion 35.

Furthermore, in the present embodiment, as mentioned above, the heat exchanger 32 including the heat exchanger body 321 and the flow passage forming portion 323, the inlet portion 34, and the outlet portion 35 are integrally formed of silicon carbide. Specifically, the heat exchanger 32, the inlet portion 34, and the outlet portion 35 are formed of a silicon carbide sintered body, for example.

The lead-in pipe 36 is a lead-in pipe that leads the heat medium from the outside of the exhaust pipe 20 via the inlet portion 34 into the heat exchanger 32. The downstream end portion (lower end portion) of the lead-in pipe 36 is connected to the inlet portion 34. Specifically, the downstream end portion of the lead-in pipe 36 is inserted into the inlet portion 34.

The O-ring 38 is disposed on the inside of the inlet portion 34 between the inlet portion 34 and the lead-in pipe 36. Specifically, the O-ring 38 is disposed between the outer surface of the lead-in pipe 36 and the inner surface of the inlet portion 34 and seals the space between the outer surface of the lead-in pipe 36 and the inner surface of the inlet portion 34. More specifically, the O-ring 38 seals the space between the outer surface of the lead-in pipe 36 and the inner surface of the inlet portion 34 in a position on the radial direction outer side (upper side) of the exhaust pipe 20.

In this way, the O-ring 38 is disposed on the inside of the inlet portion 34, so the O-ring 38 contacts the heat medium that is lower in temperature than the exhaust gas but does not contact the exhaust gas flowing through the exhaust pipe 20. That is, the O-ring 38 is disposed in a position in which it does not contact the exhaust gas flowing through the exhaust pipe 20 and in which it contacts the heat medium.

The O-ring 38 is configured in the shape of a ring with a circular cross section (see JIS B 0142) and, for example, is formed of an elastic resin material. The O-ring 38 is disposed between the outer surface of the lead-in pipe 36 and the inner surface of the inlet portion 34 in a state in which it is compressively (elastically) deformed in the radial direction.

The lead-out pipe 37 is a lead-out pipe that leads the heat medium out from the heat exchanger 32 via the outlet portion 35 to the outside of the exhaust pipe 20. The upstream end portion (lower end portion) of the lead-out pipe 37 is connected to the outlet portion 35. Specifically, the upstream end portion of the lead-out pipe 37 is inserted into the outlet portion 35.

The O-ring 39 is disposed on the inside of the outlet portion 35 between the outlet portion 35 and the lead-out pipe 37. Specifically, the O-ring 39 is disposed between the outer surface of the lead-out pipe 37 and the inner surface of the outlet portion 35 and seals the space between the outer surface of the lead-out pipe 37 and the inner surface of the outlet portion 35. More specifically, the O-ring 39 seals the space between the outer surface of the lead-out pipe 37 and the inner surface of the outlet portion 35 in a position on the radial direction outer side (upper side) of the exhaust pipe 20.

In this way, the O-ring 39 is disposed on the inside of the outlet portion 35, so the O-ring 39 contacts the heat medium that is lower in temperature than the exhaust gas but does not contact the exhaust gas flowing through the exhaust pipe 20. That is, the O-ring 39 is disposed in a position in which it does not contact the exhaust gas flowing through the exhaust pipe 20 and in which it contacts the heat medium.

The O-ring 39 is configured in the shape of a ring with a circular cross section (see JIS B 0142) and, for example, is formed of an elastic resin material. The O-ring 39 is disposed between the outer surface of the lead-out pipe 37 and the inner surface of the outlet portion 35 in a state in which it is compressively (elastically) deformed in the radial direction. In the way described above, in the present embodiment, a pair of seal members that seal the space between the inlet portion 34 and the lead-in pipe 36 and the space between the outlet portion 35 and the lead-out pipe 37 are configured by the O-rings 38 and 39.

As shown in FIG. 2, the seal 33 is disposed on the periphery of the heat exchanger 32 around the gas flow direction (direction A). Specifically, the seal 33 is disposed on side surfaces 32M and 32N, a bottom surface 32T, and an upper surface 32J of the heat exchanger 32. The seal 33 is disposed on the entireties of the side surfaces 32M and 32N and the bottom surface 32T of the heat exchanger 32. At the upper surface 32J of the heat exchanger 32, the seal 33 is formed in the shape of a frame surrounding the inlet portion 34 and the outlet portion 35 as seen in a plan view.

Additionally, the seal 33 is disposed in a compressively deformed state between the inner peripheral surface of the exhaust pipe 20 (the exhaust pipe body 22 and the cover portion 24) and the side surfaces 32M and 32N, the bottom surface 32T, and the upper surface 32J of the heat exchanger 32.

Because of this, the space between the heat exchanger 32 and the exhaust pipe 20 is sealed and ingress of the exhaust gas to the opening 25 in the exhaust pipe 20 is suppressed. That is, the seal 33 functions as a gas seal that suppresses ingress of the exhaust gas to the opening 25 in the exhaust pipe 20. Furthermore, the seal 33 is pressed against the inner peripheral surface of the exhaust pipe 20 and the side surfaces 32M and 32N, the bottom surface 32T, and the upper surface 32J of the heat exchanger 32, whereby the heat exchanger 32 is retained in the exhaust pipe 20. Moreover, the seal 33 also functions as a buffer that provides a buffer between the heat exchanger 32 and the exhaust pipe 20. As the seal 33, for example, a ceramic sheet or an expandable graphite sheet is used.

(Action and Effects of First Embodiment)

Next, the action and effects of the first embodiment will be described.

According to the exhaust heat recovery unit 30 pertaining to the first embodiment, the heat medium is led by the lead-in pipe 36 from the outside of the exhaust pipe 20 via the lead-in passage 34A of the inlet portion 34 into the inflow passage 341 of the heat exchanger 32 (see FIG. 1). The heat medium that has been led into the inflow passage 341 flows through the medium flow passages 32B of the heat exchanger body 321. Meanwhile, the exhaust gas inside the exhaust pipe 20 flows through the gas flow passages 32A of the heat exchanger body 321. Additionally, the heat medium flowing through the medium flow passages 32B of the heat exchanger body 321 exchanges heat with the exhaust gas flowing through the gas flow passages 32A. The heat medium that has exchanged heat with the exhaust gas flows through the outflow passage 351 of the heat exchanger 32 and the lead-out passage 35A of the outlet portion 35 and is thereafter led by the lead-out pipe 37 out to the outside of the exhaust pipe 20. Because of this, the heat of the exhaust gas flowing through the exhaust pipe 20 is recovered. Additionally, the heat is reutilized outside the exhaust pipe 20.

Here, in the present embodiment, the pair of seal members that seal the space between the inlet portion 34 and the lead-in pipe 36 and the space between the outlet portion 35 and the lead-out pipe 37 are configured by the O-rings 38 and 39 disposed in positions in which they do not contact the exhaust gas flowing through the exhaust pipe 20 and in which they contact the heat medium.

In this way, in the configuration of the present embodiment, the pair of seal members are disposed in positions in which they do not contact the exhaust gas flowing through the exhaust pipe 20 and in which they contact the heat medium, and they are not exposed to the high-temperature exhaust, so they are less likely to degrade, and the pair of seal members can be configured by the O-rings 38 and 39. In this way, the O-rings 38 and 39 are used as the seal members, so the seal structure in the inlet portion 34 and the outlet portion 35 can be made into an inexpensive and simple structure.

Furthermore, in the exhaust heat recovery unit 30 of the present embodiment, the heat exchanger 32, the inlet portion 34, and the outlet portion 35 are integrally formed of silicon carbide. Silicon carbide is superhard, so machining for ensuring a seal with respect to the heat medium is not easy. It will be noted that examples of machining include polishing to reduce the surface roughness of the contact surfaces that the seal members (O-rings) contact and machining to form recess portions for installing the seal members.

Additionally, in the exhaust heat recovery unit 30, the O-rings 38 and 39 seal the space between the inlet portion 34 and the lead-in pipe 36 and the space between the outlet portion 35 and the lead-out pipe 37. The O-rings 38 and 39 are configured in the shape of rings with circular cross sections. For this reason, for example, compared to a seal structure using seal members or the like formed in the shape of open cylinders (a seal structure where the seal range is wide in the axial direction of the open portions (the inlet portion 34 and the outlet portion 35)), the contact areas of the inlet portion 34 and the outlet portion 35 are smaller, and the processing range for ensuring a seal in the inlet portion 34 and the outlet portion 35 can be reduced.

Moreover, in the exhaust heat recovery unit 30, the O-ring 38 is disposed on the inside of the inlet portion 34 isolated from the internal space of the exhaust pipe 20. Moreover, the O-ring 39 is disposed on the inside of the outlet portion 35 isolated from the internal space of the exhaust pipe 20. For this reason, the O-rings 38 and 39 do not contact the exhaust gas that reaches a high temperature. In this way, by disposing the O-rings 38 and 39 on the insides of the inlet portion 34 and the outlet portion 35, it is ensured that the O-rings 38 and 39 do not contact the exhaust gas, so it is not necessary to add members for configuring the exhaust heat recovery unit in such a way that the O-rings 38 and 39 do not contact the exhaust gas.

Furthermore, in the present embodiment, the O-rings 38 and 39 seal the spaces between the outer surfaces of the lead-in pipe 36 and the lead-out pipe 37 and the inner surfaces of the inlet portion 34 and the outlet portion 35 on the radial direction outer side of the exhaust pipe 20. For this reason, the heat of the exhaust gas flowing through the exhaust pipe 20 is less likely to be transmitted to the O-rings 38 and 39, and degradation of the O-rings 38 and 39 caused by the heat of the exhaust gas can be suppressed.

Moreover, the seal 33 disposed on the periphery of the heat exchanger 32 around the gas flow direction (direction A) also functions as a buffer that provides a buffer between the heat exchanger 32 and the exhaust pipe 20. For this reason, vibration and the like occurring in the exhaust pipe 20 is not transmitted via the heat exchanger 32 to the O-rings 38 and 39, and stress acting on the O-rings 38 and 39 can be reduced.

Second Embodiment

Figure 3:
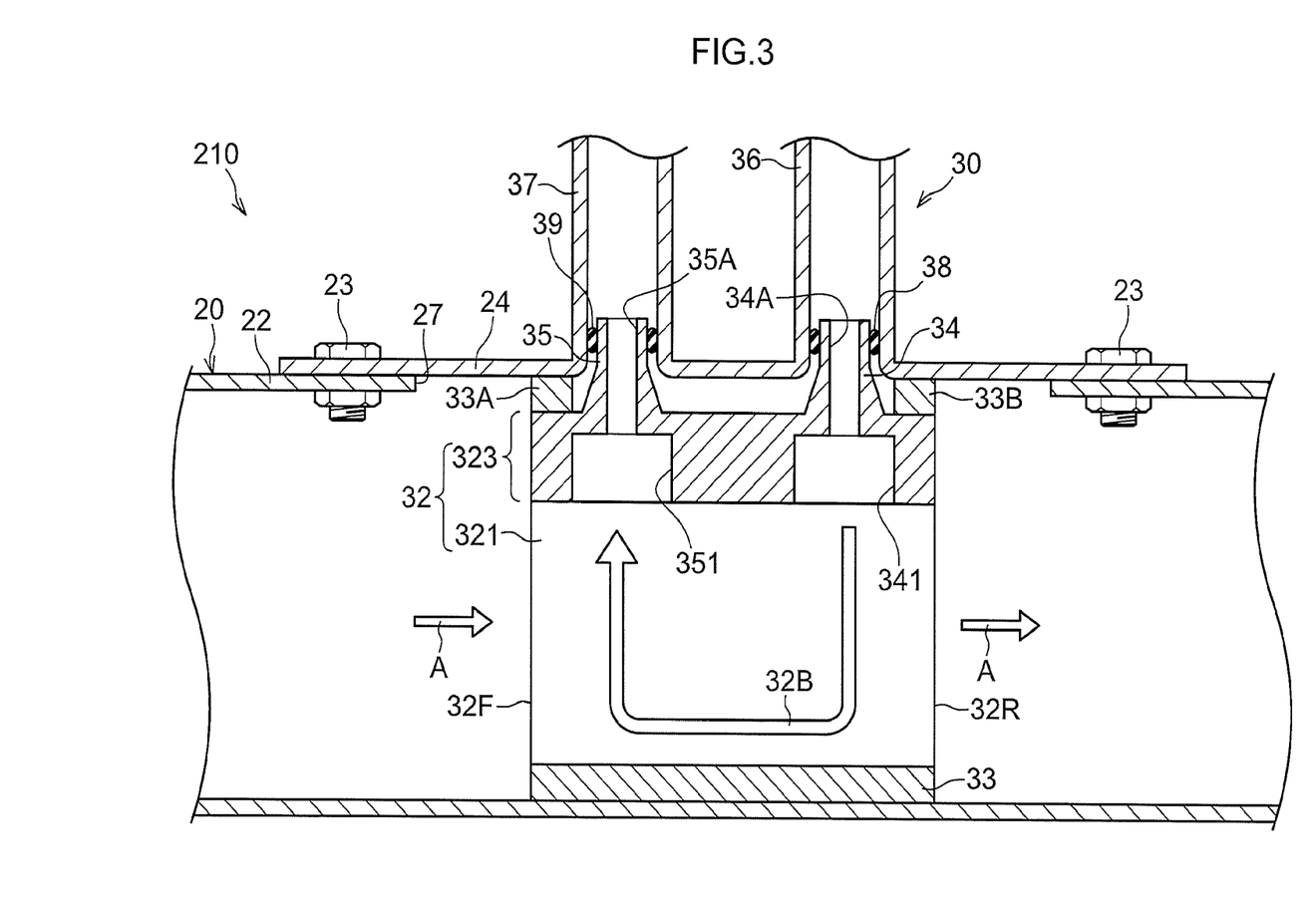
FIG. 3 is a sectional view showing the configuration of an exhaust pipe structure pertaining to a second embodiment.

Next, an exhaust pipe structure 210 to which the exhaust heat recovery unit 30 pertaining to a second embodiment has been applied will be described. FIG. 3 is a sectional view of the exhaust pipe structure 210. Here, mainly parts differing from the first embodiment will be described, and regarding parts having the same functions as those in the first embodiment, the same reference signs will be assigned thereto and description thereof will be appropriately omitted.

The exhaust pipe structure 210 is an exhaust pipe structure for a vehicle such as an automobile, and is a pipe structure for exhausting to the atmosphere (outside the vehicle) exhaust gas exhausted from the engine of the vehicle.

As shown in FIG. 3, the opening 25 of the first embodiment is not formed in the cover portion 24 of the exhaust pipe 20 of the exhaust pipe structure 210, and the lead-in pipe 36 and the lead-out pipe 37 are provided integrally with the cover portion 24. Specifically, the downstream end portion of the lead-in pipe 36 and the upstream end portion of the lead-out pipe 37 are connected to the cover portion 24.

In the exhaust pipe structure 210, the distal end portion of the inlet portion 34 of the exhaust heat recovery unit 30 is inserted into the lead-in pipe 36. Additionally, the O-ring 38 is disposed on the inside of the lead-in pipe 36 between the inlet portion 34 and the lead-in pipe 36. Specifically, the O-ring 38 is disposed between the outer surface of the inlet portion 34 and the inner surface of the lead-in pipe 36 and seals the space between the outer surface of the inlet portion 34 and the inner surface of the lead-in pipe 36.

More specifically, the O-ring 38 seals the space between the outer surface of the inlet portion 34 and the inner surface of the lead-in pipe 36 in a position on the radial direction outer side (upper side) of the exhaust pipe 20. In this way, the O-ring 38 is disposed on the inside of the lead-in pipe 36 and on the radial direction outer side of the exhaust pipe 20, so the O-ring 38 contacts the heat medium that is lower in temperature than the exhaust gas but does not contact the exhaust gas flowing through the exhaust pipe 20. That is, the O-ring 38 is disposed in a position in which it does not contact the exhaust gas flowing through the exhaust pipe 20 and in which it contacts the heat medium. Furthermore, the O-ring 38 is disposed between the outer surface of the inlet portion 34 and the inner surface of the lead-in pipe 36 in a state in which it is compressively (elastically) deformed in the radial direction.

Furthermore, in the exhaust pipe structure 210, the distal end portion of the outlet portion 35 in the exhaust heat recovery unit 30 is inserted into the lead-out pipe 37. Additionally, the O-ring 39 is disposed on the inside of the lead-out pipe 37 between the outlet portion 35 and the lead-out pipe 37. Specifically, the O-ring 39 is disposed between the outer surface of the outlet portion 35 and the inner surface of the lead-out pipe 37 and seals the space between the outer surface of the outlet portion 35 and the inner surface of the lead-out pipe 37.

More specifically, the O-ring 39 seals the space between the outer surface of the outlet portion 35 and the inner surface of the lead-out pipe 37 in a position on the radial direction outer side (upper side) of the exhaust pipe 20. In this way, the O-ring 39 is disposed on the inside of the lead-out pipe 37 and on the radial direction outer side of the exhaust pipe 20, so the O-ring 39 contacts the heat medium that is lower in temperature than the exhaust gas but does not contact the exhaust gas flowing through the exhaust pipe 20. That is, the O-ring 39 is disposed in a position in which it does not contact the exhaust gas flowing through the exhaust pipe 20 and in which it contacts the heat medium. Furthermore, the O-ring 39 is disposed between the outer surface of the outlet portion 35 and the inner surface of the lead-out pipe 37 in a state in which it is compressively (elastically) deformed in the radial direction.

It will be noted that the base end portion (lower end portion) of the inlet portion 34 and the base end portion (lower end portion) of the outlet portion 35 are each formed in a tapered shape whose outer diameter gradually increases toward the base end side (lower side).

Furthermore, the seal 33 (an example of a gas seal) has an upstream part 33A and a downstream part 33B disposed on the upstream side and the downstream side of the O-rings 38 and 39 in the gas flow direction (direction A). Because of this, the seal 33 suppresses the exhaust gas flowing through the exhaust pipe 20 in the direction of arrows A from going to the O-rings 38 and 39 on the upstream side and the downstream side of the O-rings 38 and 39 in the gas flow direction (direction A). For this reason, the O-rings 38 and 39 are less likely to be exposed to the high-temperature exhaust gas, and degradation of the O-rings 38 and 39 can be suppressed.

Furthermore, as mentioned above, in the configuration of the present embodiment, the pair of seal members are disposed in positions in which they do not contact the exhaust gas flowing through the exhaust pipe 20 and in which they contact the heat medium, and they are not exposed to the high-temperature exhaust gas, so they are less likely to degrade, and the pair of seal members can be configured by the O-rings 38 and 39. In this way, the O-rings 38 and 39 are used as the seal members, so the seal structure in the inlet portion 34 and the outlet portion 35 can be made into an inexpensive and simple structure.

Furthermore, the O-rings 38 and 39 seal the spaces between the inner surfaces of the lead-in pipe 36 and the lead-out pipe 37 and the outer surfaces of the inlet portion 34 and the outlet portion 35 on the radial direction outer side of the exhaust pipe 20. For this reason, the heat of the exhaust gas flowing through the exhaust pipe 20 is less likely to be transmitted to the O-rings 38 and 39, and degradation of the O-rings 38 and 39 caused by the heat of the exhaust gas can be suppressed.

Example Modifications

In the first and second embodiments, a coolant is used as the heat medium, but the heat medium is not limited to this. As the heat medium, fluids such as liquids and gases used in heat exchange can be widely applied.

In the first and second embodiments, the heat exchanger 32 including the heat exchanger body 321 and the flow passage forming portion 323, the inlet portion 34, and the outlet portion 35 are integrally formed of silicon carbide, but they are not limited to this. For example, the heat exchanger 32, the inlet portion 34, and the outlet portion 35 may also be assembled after being separately formed. Furthermore, the heat exchanger 32, the inlet portion 34, and the outlet portion 35 may also be formed of a material other than silicon carbide.

In the first and second embodiments, both the inlet portion 34 and the outlet portion 35 are formed of silicon carbide, but they are not limited to this. For example, it suffices for one of the inlet portion 34 and the outlet portion 35 to be formed of silicon carbide, and the other of the inlet portion 34 and the outlet portion 35 may be assembled after being formed of a material other than silicon carbide. Moreover, in a case where one of the inlet portion 34 and the outlet portion 35 is formed of a material other than silicon carbide, a seal member other than an O-ring may be disposed with respect to the one.

In the first and second embodiments, the seal 33 is disposed on the periphery of the heat exchanger 32 around the gas flow direction (direction A), but the seal 33 is not limited to this. The seal 33 may also have a configuration where, for example, it only has a part formed in the shape of a frame surrounding the inlet portion 34 and the outlet portion 35 as seen in a plan view at the upper surface 32J of the heat exchanger 32.

The present disclosure is not limited to the above embodiments and can be modified, changed, and improved in various ways in a range that does not depart from the spirit thereof.

An object of the present disclosure is to obtain an exhaust heat recovery unit that can make the seal structure at an open portion into a simple structure.

A first aspect of an exhaust heat recovery unit includes: a heat exchanger provided inside an exhaust pipe through which exhaust gas flows, the heat exchanger exchanging heat between the exhaust gas and a heat medium; a pair of open portions that include an inlet portion and an outlet portion, the inlet portion being formed in the heat exchanger and being configured to lead the heat medium into the heat exchanger, and the outlet portion being formed in the heat exchanger and being configured to lead the heat medium out from the heat exchanger; a lead-in pipe that is connected to the inlet portion and leads the heat medium from outside the exhaust pipe, via the inlet portion, into the heat exchanger; a lead-out pipe that is connected to the outlet portion and leads the heat medium out from the heat exchanger, via the outlet portion, outside the exhaust pipe; and a pair of seal members that seal a space between the inlet portion and the lead-in pipe and a space between the outlet portion and the lead-out pipe, with at least one of the pair of seal members including an O-ring disposed in a position in which the at least one of the pair of seal members does not contact the exhaust gas flowing through the exhaust pipe and in which the at least one of the pair of seal members contacts the heat medium.

According to the exhaust heat recovery unit of the first aspect, the heat medium is led by the lead-in pipe from the outside of the exhaust pipe via the inlet portion into the heat exchanger. The heat medium that has been led into the heat exchanger exchanges heat in the heat exchanger with the exhaust gas flowing through the exhaust pipe. The heat medium that has exchanged heat with the exhaust gas is led by the lead-out pipe out from the heat exchanger via the outlet portion to the outside of the exhaust pipe.

Here, in the first aspect, at least one of the pair of seal members that seal the space between the inlet portion and the lead-in pipe and the space between the outlet portion and the lead-out pipe is configured by an O-ring disposed in a position in which it does not contact the exhaust gas flowing through the exhaust pipe and in which it contacts the heat medium.

In this way, in the first aspect, at least one of the pair of seal members is disposed in a position in which it does not contact the exhaust gas flowing through the exhaust pipe and in which it contacts the heat medium, and it is not exposed to the high-temperature exhaust gas, so the at least one can be configured by an O-ring. In this way, an O-ring is used as the seal member, so the seal structure in the open portions can be made into a simple structure.

A second aspect is the first aspect of the exhaust heat recovery unit. The lead-in pipe and the lead-out pipe are respectively inserted into the pair of open portions, and each O-ring is disposed on inner sides of the pair of open portions and seals spaces between outer surfaces of the lead-in pipe and the lead-out pipe and inner surfaces of the pair of open portions.

According to the exhaust heat recovery unit of the second aspect, the O-rings are disposed on the insides of the pair of open portions, so the O-rings do not contact the exhaust gas flowing through the exhaust pipe. In this way, by providing the O-rings on the insides of the open portions, it is ensured that the O-rings do not contact the exhaust gas, so it is not necessary to add members for configuring the exhaust heat recovery unit in such a way that the O-rings do not contact the exhaust gas.

A third aspect is the second aspect of the exhaust heat recovery unit. The pair of open portions project outward in a radial direction of the exhaust pipe, and each O-ring seals the spaces between the outer surfaces of the lead-in pipe and the lead-out pipe and the inner surfaces of the pair of open portions on a radial direction outer side of the exhaust pipe.

According to the exhaust heat recovery unit of the third aspect, the O-rings seal the spaces between the outer surfaces of the lead-in pipe and the lead-out pipe and the inner surfaces of the pair of open portions on the radial direction outer side of the exhaust pipe.

For this reason, the heat of the exhaust gas flowing through the exhaust pipe is less likely to be transmitted to the O-rings, and degradation of the O-rings caused by the heat of the exhaust gas can be suppressed.

A fourth aspect is the first or second aspect of the exhaust heat recovery unit that further includes a buffer that is disposed on a periphery of the heat exchanger around a flow direction of the exhaust gas, seals a space between the heat exchanger and the exhaust pipe, and provides a buffer between the heat exchanger and the exhaust pipe.

According to the exhaust heat recovery unit of the fourth aspect, the buffer disposed on the periphery of the heat exchanger around the flow direction of the exhaust gas seals the space between the heat exchanger and the exhaust pipe and provides a buffer between the heat exchanger and the exhaust pipe.

For this reason, vibration and the like occurring in the exhaust pipe is less likely to be transmitted via the heat exchanger to the O-rings, and stress acting on the O-rings can be reduced.

A fifth aspect is the first aspect of the exhaust heat recovery unit. The pair of open portions are respectively inserted into the lead-in pipe and the lead-out pipe, each O-ring is disposed on inner sides of the lead-in pipe and the lead-out pipe and seals spaces between inner surfaces of the lead-in pipe and the lead-out pipe and outer surfaces of the pair of open portions, and the exhaust heat recovery unit further comprises gas seals disposed on an upstream side and a downstream side of the O-rings in a gas flow direction.

According to the exhaust heat recovery unit of the fifth aspect, the gas seals are disposed on the upstream side and the downstream side of the O-rings in the gas flow direction, so ingress of the exhaust gas to the O-rings is suppressed. Because of this, the O-rings are even less likely to be exposed to the high-temperature exhaust gas, and degradation of the O-rings can be suppressed.

A sixth aspect is the fifth aspect of the exhaust heat recovery unit. The pair of open portions project outward in a radial direction of the exhaust pipe, and the O-rings seal the spaces between the inner surfaces of the lead-in pipe and the lead-out pipe and the outer surfaces of the pair of open portions on a radial direction outer side of the exhaust pipe.

According to the exhaust heat recovery unit of the sixth aspect, the O-rings seal the spaces between the inner surfaces of the lead-in pipe and the lead-out pipe and the outer surfaces of the pair of open portions on the radial direction outer side of the exhaust pipe.

For this reason, the heat of the exhaust gas flowing through the exhaust pipe is less likely to be transmitted to the O-rings, and degradation of the O-rings caused by the heat of the exhaust gas can be suppressed.

A seventh aspect is any of the first to sixth aspect of the exhaust heat recovery unit. The heat exchanger and the pair of open portions are integrally formed of silicon carbide.

Here, silicon carbide is superhard, so machining performed with respect to the open portions to ensure a seal between the pair of open portions formed of silicon carbide and the lead-in pipe and the lead-out pipe has not been easy. It will be noted that examples of machining for ensuring a seal include polishing to reduce the surface roughness of the contact surfaces that the seal members contact and machining to form recess portions for installing the seal members.

In contrast, in the present disclosure, the seal members are configured by O-rings, so, for example, compared to a seal structure using seal members or the like formed in the shape of open cylinders (a seal structure where the seal range is wide), the contact areas between the open portions formed of silicon carbide and the O-rings are smaller, and the processing range for ensuring a seal in the open portions formed of silicon carbide can be reduced.

The present disclosure is given the configuration described above, so it can make the seal structure at the open portions into a simple structure.

What is claimed is:

1. An exhaust heat recovery unit comprising:
   a heat exchanger provided inside an exhaust pipe through which exhaust gas flows, the heat exchanger exchanging heat between the exhaust gas and a heat medium;
   a pair of open portions that include an inlet portion and an outlet portion, the inlet portion being formed in the heat exchanger and being configured to lead the heat medium into the heat exchanger, and the outlet portion being formed in the heat exchanger and being configured to lead the heat medium out from the heat exchanger;
   a lead-in pipe that is connected to the inlet portion and leads the heat medium from outside the exhaust pipe, via the inlet portion, into the heat exchanger;
   a lead-out pipe that is connected to the outlet portion and leads the heat medium out from the heat exchanger, via the outlet portion, outside the exhaust pipe; and
   a pair of seal members that seal a space between the inlet portion and the lead-in pipe and a space between the outlet portion and the lead-out pipe, with at least one seal member of the pair of seal members including an O-ring disposed in a position in which the at least one seal member of the pair of seal members does not contact the exhaust gas flowing through the exhaust pipe and in which the at least one seal member of the pair of seal members contacts the heat medium.

2. The exhaust heat recovery unit according to claim 1, wherein
   each seal member of the pair of seal members includes the O-ring,
   the lead-in pipe and the lead-out pipe are respectively inserted into the pair of open portions, and
   each O-ring is disposed on inner sides of the pair of open portions and respectively seals spaces between outer surfaces of the lead-in pipe and the lead-out pipe and inner surfaces of the pair of open portions.

3. The exhaust heat recovery unit according to claim 2, wherein
   the pair of open portions project outward in a radial direction of the exhaust pipe, and
   each O-ring respectively seals the spaces between the outer surfaces of the lead-in pipe and the lead-out pipe and the inner surfaces of the pair of open portions on a radial direction outer side of the exhaust pipe.

4. The exhaust heat recovery unit according to claim 1, further comprising a buffer that is disposed on a periphery of the heat exchanger around a flow direction of the exhaust gas, seals a space between the heat exchanger and the exhaust pipe, and provides a buffer between the heat exchanger and the exhaust pipe.

5. The exhaust heat recovery unit according to claim 1, further comprising a buffer that has a shape of a frame surrounding the inlet portion and the outlet portion in a plan view at an upper surface of the heat exchanger, seals a space between the heat exchanger and the exhaust pipe, and provides a buffer between the heat exchanger and the exhaust pipe.

6. The exhaust heat recovery unit according to claim 1, wherein
   each seal member of the pair of seal members includes the O-ring,
   the pair of open portions are respectively inserted into the lead-in pipe and the lead-out pipe,
   each O-ring is respectively disposed on inner sides of the lead-in pipe and the lead-out pipe and respectively seals spaces between inner surfaces of the lead-in pipe and the lead-out pipe and outer surfaces of the pair of open portions, and
   the exhaust heat recovery unit further comprises gas seals disposed on an upstream side and a downstream side of the O-rings in a gas flow direction.

7. The exhaust heat recovery unit according to claim 6, wherein
   the pair of open portions project outward in a radial direction of the exhaust pipe, and
   the O-rings seal the spaces between the inner surfaces of the lead-in pipe and the lead-out pipe and the outer surfaces of the pair of open portions on a radial direction outer side of the exhaust pipe.

8. The exhaust heat recovery unit according to claim 1, wherein the heat exchanger and the pair of open portions are integrally formed of silicon carbide.

9. The exhaust heat recovery unit according to claim 1, wherein the heat medium is a coolant.

* * * * *